(12) United States Patent
Nakamura (10) Patent No.: US 12,370,934 B2
(45) Date of Patent: Jul. 29, 2025

(54) TABLE DEVICE

(71) Applicant: HONDA MOTOR CO., LTD., Tokyo (JP)

(72) Inventor: Mitsuyoshi Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 416 days.

(21) Appl. No.: 17/963,608

(22) Filed: Oct. 11, 2022

(65) Prior Publication Data

US 2023/0125485 A1   Apr. 27, 2023

(30) Foreign Application Priority Data

Oct. 26, 2021   (JP) .................. 2021-174423

(51) Int. Cl.
*B60N 3/00* (2006.01)
*B60N 3/10* (2006.01)
*B60R 7/04* (2006.01)

(52) U.S. Cl.
CPC ............. *B60N 3/001* (2013.01); *B60N 3/101* (2013.01); *B60R 7/04* (2013.01)

(58) Field of Classification Search
CPC ........ B60N 3/001; B60N 3/101; B60N 3/002; B60R 7/04
USPC .......... 296/24.44, 24.45, 26.08, 26.13, 37.1; 108/45; 297/411.2
See application file for complete search history.

(56) References Cited

U.S. PATENT DOCUMENTS

| | | | | |
|---|---|---|---|---|
| 5,372,403 A * | 12/1994 | Puerto | ..................... | A47C 7/70 297/188.17 |
| 5,562,331 A * | 10/1996 | Spykerman | ............ | B60N 2/793 297/DIG. 6 |
| 5,820,194 A * | 10/1998 | Slayter | ................... | B60N 3/001 108/45 |
| 6,032,587 A * | 3/2000 | Salenbauch | ............ | B60N 3/002 108/44 |
| 9,878,671 B2 * | 1/2018 | Murray | ..................... | B60R 7/04 |
| 10,919,426 B1 * | 2/2021 | Campagnone | ............ | B60R 7/04 |
| 2023/0192002 A1 * | 6/2023 | Boinais | ..................... | B60R 7/04 296/37.8 |
| 2024/0083321 A1 * | 3/2024 | Thomas | ................... | B60N 2/77 |

FOREIGN PATENT DOCUMENTS

| | | | | |
|---|---|---|---|---|
| CN | 203611869 U | 5/2014 | | |
| EP | 4177111 A1 * | 5/2023 | ............... | B60R 7/04 |
| FR | 3107229 A1 | 8/2021 | | |
| JP | 2000-264107 A | 9/2000 | | |
| JP | 2001-277945 A | 10/2001 | | |

(Continued)

OTHER PUBLICATIONS

Chinese Office Action received in corresponding Chinese application No. 202211246502.3 dated Apr. 3, 2024 with English translation (12 pages).

*Primary Examiner* — Joseph D. Pape
(74) *Attorney, Agent, or Firm* — Rankin, Hill & Clark LLP (57) ABSTRACT

A table device includes a first table expandable forward from a center console, and a second table expandable rearward from an instrument panel. The first table and the second table are configured such that end portions thereof are detachably cooperative with each other to form a continuous table surface extending in a front-rear direction.

8 Claims, 6 Drawing Sheets

(56) References Cited

FOREIGN PATENT DOCUMENTS

| JP | 2015-98211 A | | 5/2015 | |
|----|----|----|----|----|
| JP | 2017165198 A | * | 9/2017 | |
| JP | 2019-214227 A | | 12/2019 | |
| WO | WO-2008100216 A1 | * | 8/2008 | ............. B60N 3/002 |

* cited by examiner

TABLE DEVICE

CROSS-REFERENCE TO RELATED APPLICATION

This application claims the benefit of foreign priority to Japanese Patent Application No. 2021-174423, filed on Oct. 26, 2021, which is incorporated by reference in its entirety.

TECHNICAL FIELD

This invention relates to a table device for vehicles.

BACKGROUND

A conventional table device for vehicles has been known, for example, from JP 2001-277945 A, which table device includes a lid member having a generally L-shaped cross section and capable of rotating around an axis portion provided at a front lower side of a console to open and close an upper opening of the console, and a table that can be pulled forward from a storage area of the console.

This table device is configured such that an end portion of the table having been pulled forward from the console is engageable with an inner wall of the lid member that has been rotated from the console to turn over from a closed state in which the upper opening of the console is closed to an open state in which the upper opening is open. According to this table device, a walk-through space formed frontward of the console can be efficiently used as a space for placing articles by means of the table extending forward from the console.

However, in the conventional table device disclosed in JP 2001-277945 A, the length of the table that can be pulled out from the console is limited to the distance from the console to the inner wall of the lid member having been turned over to the open state. For this reason, the conventional table device has a drawback that a sufficiently large table surface cannot be obtained in the front-rear direction.

In view of the above, an object of the present invention is to provide a table device that can further improve the comfort of the vehicle cabin by ensuring a larger table surface in the front-rear direction as compared with the conventional table device.

SUMMARY

According to one aspect of the present invention, a table device comprises: a first table expandable forward from a center console; and a second table expandable rearward from an instrument panel, wherein the first table and the second table are configured such that end portions thereof are detachably cooperative with each other to form a continuous table surface extending in a front-rear direction.

BRIEF DESCRIPTION OF THE DRAWINGS

The drawings described herein are for illustration purposes only and are not intended to limit the scope of the present invention in any way.

DETAILED DESCRIPTION

One embodiment for implementing a table device according to the present invention is described in detail with reference to the drawings as appropriate.

In the following description, directions such as front, rear, upper, lower, right, and left are based on corresponding directions of a vehicle, such as front, rear, upper, lower, right, and left of the vehicle, as shown by directions of the arrows in each of the figures.

Figure 1:
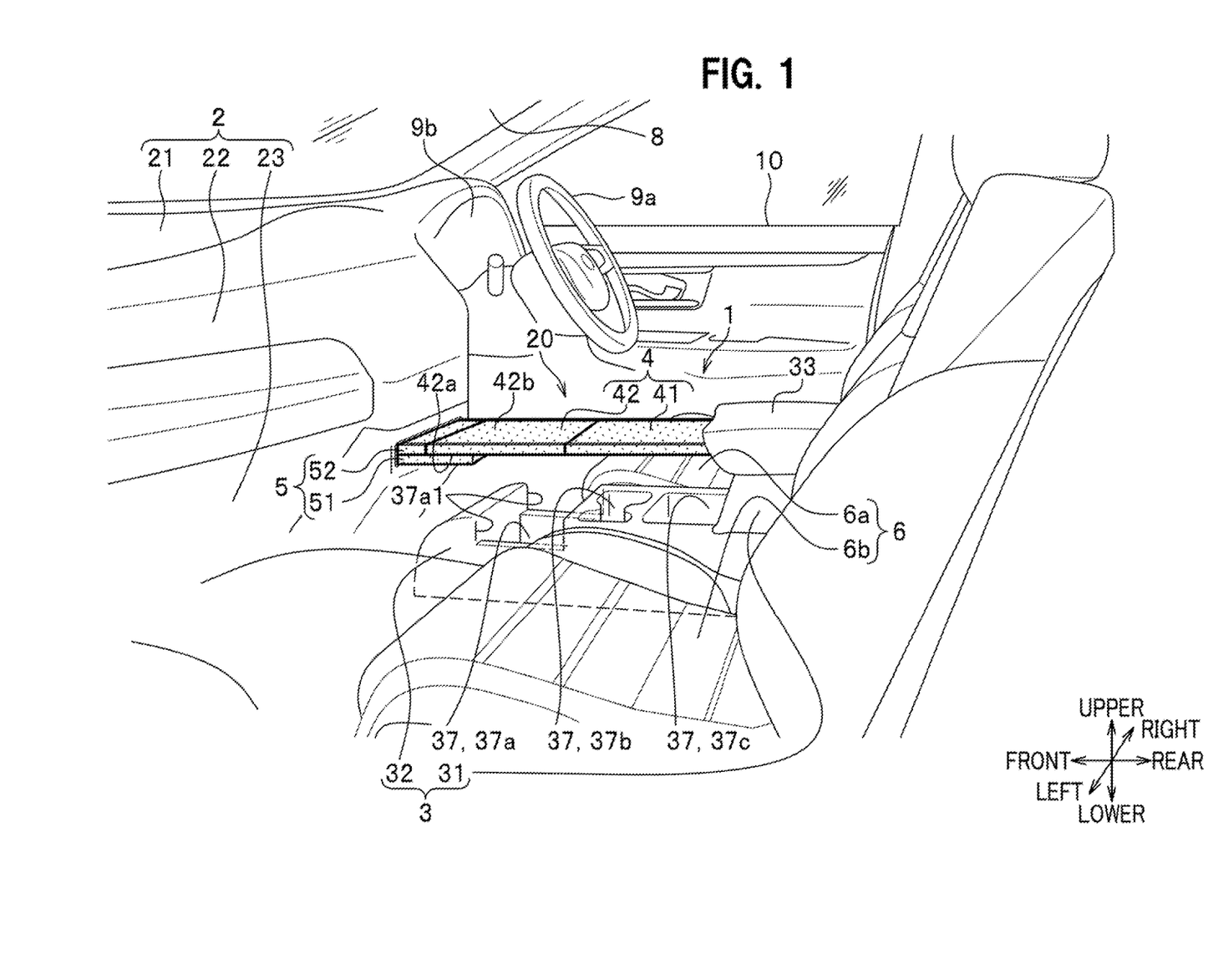
FIG. 1 is a partially enlarged perspective view showing the interior of a vehicle, in which a table device according to one embodiment of the present invention is provided.

FIG. 1 is a partially enlarged perspective view, as viewed from the left side of the vehicle, showing the interior of a vehicle 10 equipped with a table device 1 according to one embodiment of the present invention.

The vehicle 10, in which the table device 1 according to this embodiment is mounted, includes a front seat 6 (driver seat 6a and front passenger seat 6b) behind an instrument panel 2 and facing the instrument panel 2.

As seen in FIG. 1, the table device 1 includes a first table 4 and a second table 5 that extend between an instrument panel 2 and a center console 3 (hereinafter simply referred to as a "console 3") in a front compartment of the vehicle 10.

<<Instrument Panel>>

The instrument panel 2 is formed to face an occupant seated on the front seat 6 (driver seat 6a and front passenger seat 6b). To be more specific, the instrument panel 2 has an upper shelf surface 21 extending substantially horizontally or slightly downward from the vicinity of the lower end of the windshield 8 in a rearward direction, a vertical wall surface 22 bent at the rear edge of the upper shelf surface 21 and extending downward, and a lower slanted surface 23 extending diagonally downward and frontward from the lower edge of the vertical wall surface 22.

The vehicle 10 according to this embodiment is a right-hand drive vehicle, and the steering wheel 9a is disposed on the right side of the instrument panel 2.

A driving information display 9b is provided in the instrument panel 2 to rise upward. The driving information display 9b is located frontward of the steering wheel 9a. Although not shown in the drawings, various switches for a car navigation device and an air conditioning unit, etc. are arranged on the instrument panel 2 at the vertical wall surface 22 and/or in the vicinity of the boundary between the vertical wall surface 22 and the lower slanted surface 23. As described in detail later, the second table 5 constituting the table device 1 of this embodiment is attached to the instrument panel 2.

<<Center Console>>

As seen in FIG. 1, the console 3 of this embodiment is disposed behind a laterally central portion of the instrument panel 2 in the vehicle width direction.

The console 3 is a box member disposed between the driver seat 6a and the front passenger seat 6b and extending in the front-rear direction. The console 3 is attached to a floor panel (not shown).

The console 3 of this embodiment mainly includes a console body 31 and a front extension portion 32 that is integrally formed with the console body 31 to extend forward from the console body 31.

Figure 2:
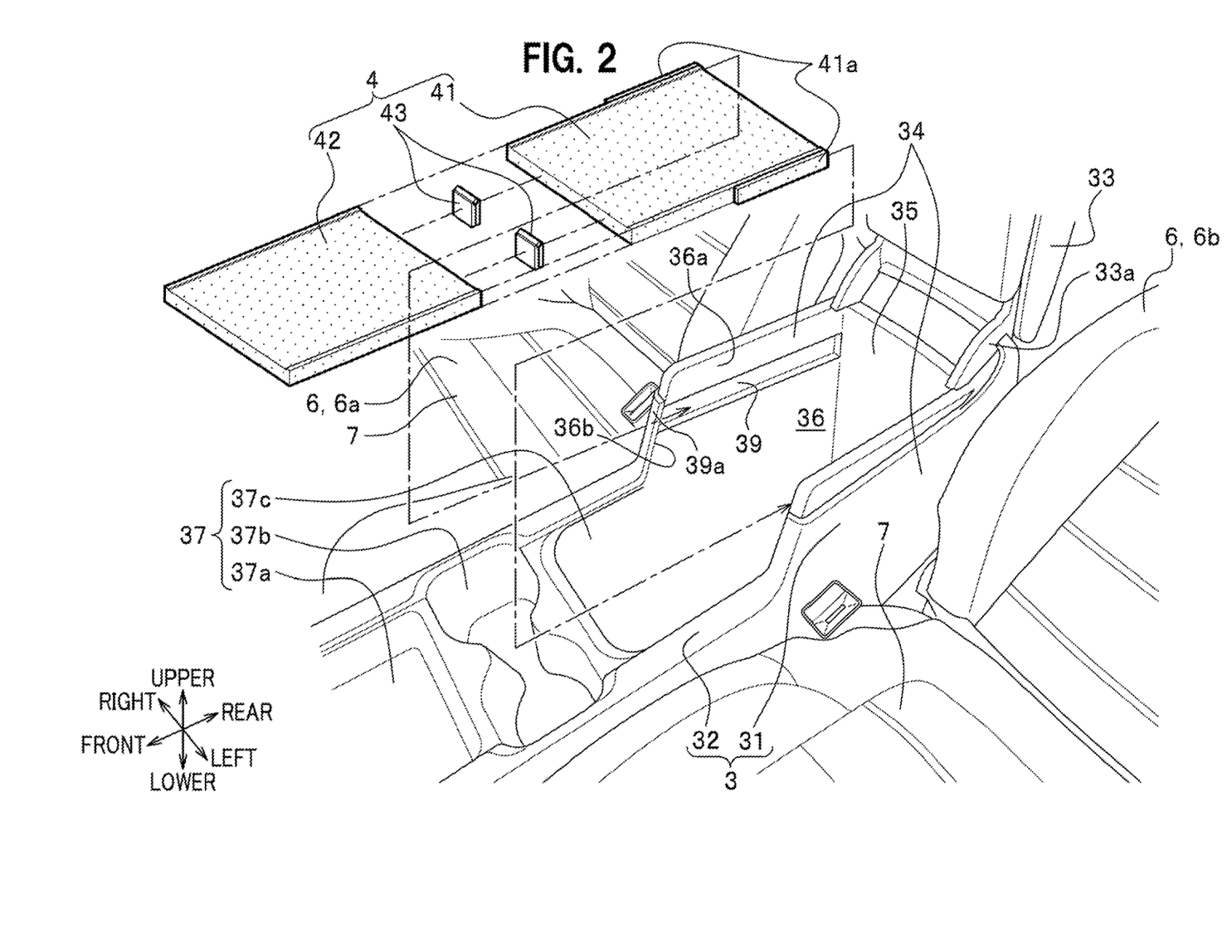
FIG. 2 is a partially enlarged perspective view showing a storage area of a center console to which a first table constituting the table device of FIG. 1 is attached, looking down diagonally from an upper front left side.

FIG. 2 is a partially enlarged perspective view showing the console body 31, looking down diagonally from the upper front left side. In FIG. 2, the reference numeral 4 denotes the first table to be described later, and the first table 4 removed from the console body 31 is shown in an exploded view in FIG. 2.

As seen in FIG. 2, the console body 31 is provided in a position corresponding to the vicinity of the rear end portion of the seating surface 7 of the front seat 6 when the front seat 6 is in a normal position in the front-rear direction.

The console body 31 of this embodiment includes a pair of right and left side walls 34, and a rear wall 35 connecting rear ends of the side walls 34.

The console body 31 has a U-shaped configuration as viewed from above, and a storage area 36 for articles (not shown) is formed inward of the side walls 34.

The storage area 36 of the console body 31 has an opening 36a and an opening 36b that extend from the upper portion to the front portion of the console body 31.

As seen in FIG. 1, an armrest 33 is attached to an upper portion of the console body 31.

As seen in FIG. 2, the armrest 33 is configured to rotate around a hinge 33a provided at an upper rear portion of the console body 31, from a closed state (see FIG. 1) in which the opening 36a of the storage area 36 is closed by the armrest 33 to an open state in which the armrest 33 is flipped up. The armrest 33 in the closed state (see FIG. 1) only closes the upper opening 36a, and the front opening 36b is left open.

The armrest 33 is configured such that the height thereof in the closed state (see FIG. 1) corresponds generally to the position of the elbow of an average-sized occupant when he/she is seated on the front seat 6.

As seen in FIG. 2, guide grooves 39 extending in the front-rear direction are formed in upper portions of the side walls 34 that define the storage area 36.

The slide table 41 constituting the first table 4 to be described later has protruding edge portions 41a that are fitted into and slidable along the guide grooves 39 in the front-rear direction.

In FIG. 2, the reference numeral 39a denotes closed portions of the guide grooves 39 that serve as a stopper for the slide table 41.

Next, the front extension portion 32 of the console 3 is described with reference to FIGS. 1 and 2.

The front extension portion 32 is disposed in a position lower than the height of the console body 31 and extendable in the front-rear direction.

The front extension portion 32 has a plurality of recesses 37 formed to open upward and arranged in the front-rear direction.

To be more specific, the recesses 37 includes a recess 37a (see FIG. 1), a recess 37b (see FIG. 2), and a recess 37c (see FIG. 2) in this order from the front side of the vehicle. The recess 37a has a rectangular opening as viewed from above and serves as a storage compartment. The recess 37b serves as cup holders with two generally cylindrical spaces connected side by side. The recess 37c is integrated with the storage area 36 (see FIG. 2) of the console body 31 (see FIG. 2) in the front-rear direction to form a relatively large storage compartment.

It should be noted that each of the recesses 37a, 37b, 37c corresponds to "another storage area" defined in the claims.

If these recesses 37a, 37b, 37c are not distinguished from each other, they are collectively and simply referred to as a "recess 37".

Further, as seen in FIG. 1, the recess 37a is located more frontward than the front edge of the front seat 6. A load/unload opening 37a1 for articles is formed on each lateral side surface (in the vehicle width direction) of the front extension portion 32 corresponding to the position of the recess 37a. The load/unload opening 37a1 faces the recess 37a from the side of the front extension portion 32.

Although not shown in FIG. 1, the recesses 37b, 37c may have a load/unload opening for articles formed on each side thereof in the vehicle width direction.

It should be noted that the number and/or the shape of recesses 37 and/or the presence or absence of the load/unload opening for articles of this embodiment are not limited to those of the above-described embodiment and may be set appropriately in accordance with the shape and/or the size of the console 3.

It is assumed that according to the console 3 of this embodiment, the front end of the front extension portion 32 and the instrument panel 2 are close to each other. However, according to the table device 1 of this embodiment, the longitudinal length of the front extension portion 32 in the front-rear direction may be shortened such that a walk-through space that allows an occupant to move between the driver seat 6a and the front passenger seat 6b can be formed between the console 3 and the instrument panel 2.

Further, the table device 1 of this embodiment may be configured such that the instrument panel 2 and the front extension portion 32 are directly connected or indirectly connected via another structure.

<<First Table>>

The first table 4 (see FIG. 1) is explained below.

As seen in FIG. 1, the first table 4 is expandable forward from the upper portion of the console body 31.

As seen in FIG. 2, the first table 4 includes the slide table 41, a turning table 42, and hinges 43.

It should be noted that the slide table 41 corresponds to "one table portion" defined in the claims and the turning table 42 corresponds to "another table portion" defined in the claims.

The slide table 41 is formed of a plate member having a generally rectangular planar shape with the longitudinal length and the lateral width thereof correspond to the longitudinal length and the lateral width of the storage area 36 of the console body 31.

Further, the slide table 41 has protruding edge portions 41a on both sides thereof in the vehicle width direction. The protruding edge portions 41a are formed to extend rearward from a longitudinally middle portion of the slide table 41 in the front-rear direction. The rear portion of the slide table 41 with the protruding edges 41a is wider in its lateral width (width in the vehicle width direction) than the front portion of the slide table 41.

The protruding edge portions 41a are slidably fitted into the guide grooves 39 of the storage area 36, so that the slide table 41 is stored in the storage area 36 and supported in the storage area 36 to slide in the front-rear direction.

As seen in FIG. 2, the turning table 42 of this embodiment is formed of a plate member having a generally rectangular planar shape with the longitudinal length and the lateral width thereof substantially the same as those of the slide table 41 except that the turning table 42 does not have the above-described protruding edge portions 41a.

A rear end portion of the turning table 42 is connected to an end portion of the slide table 41 via the hinges 43.

The end portion of the turning table 42 rotates around the hinges 43. This allows the turning table 42 to be deployed from a state in which the turning table 42 is stacked above the slide table 41 to a state in which the turning table 42 is expanded further forward from the end portion of the slide table 41.

<<Second Table>>

The second table 5 (see FIG. 1) is explained below.

As seen in FIG. 1, the second table 5 is expandable rearward from the instrument panel 2.

Figure 3A:
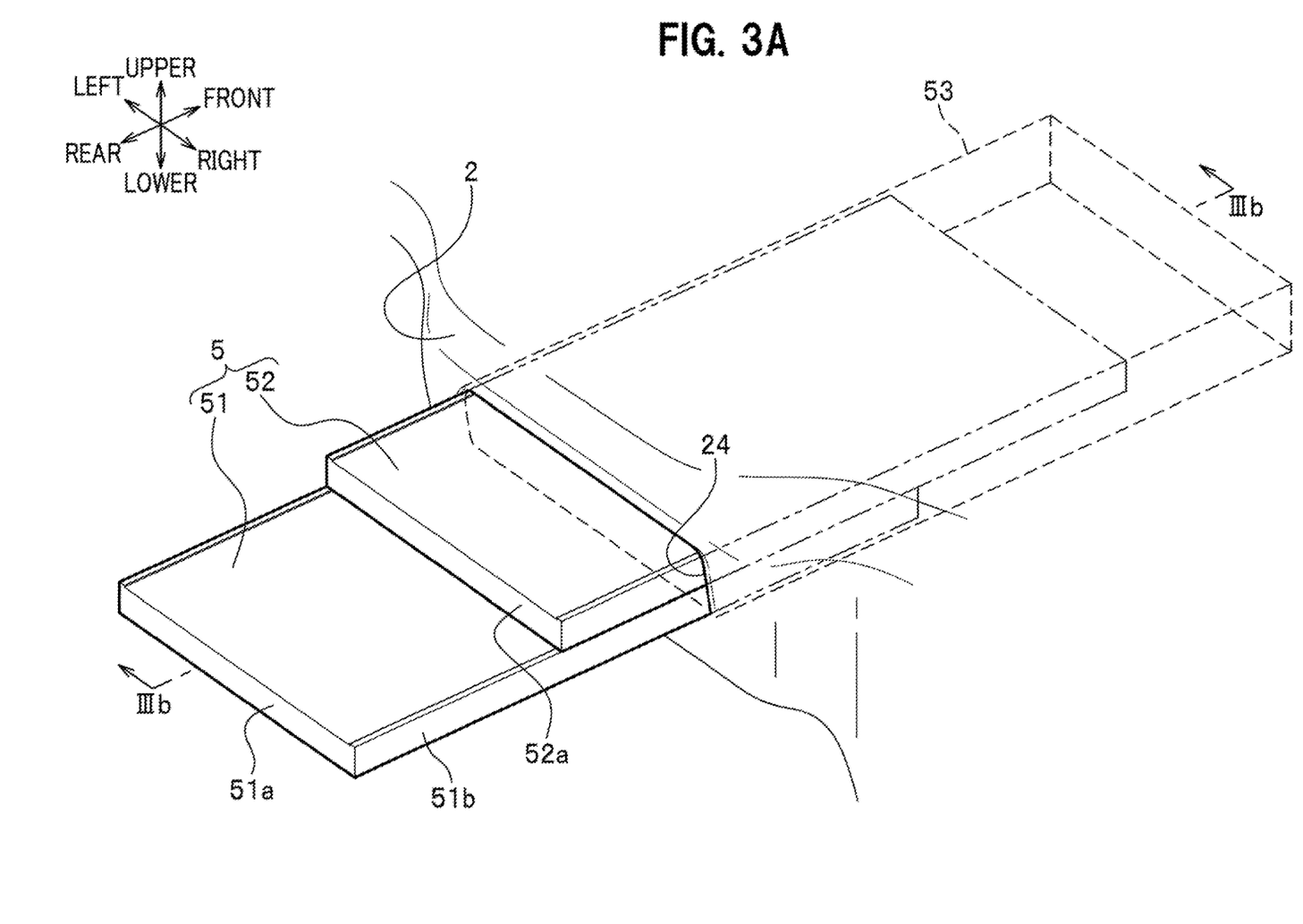
FIG. 3A is a partially enlarged perspective view showing a portion of an instrument panel to which a second table constituting the table device of FIG. 1 is attached, looking down diagonally from an upper rear right side.
Figure 3B:
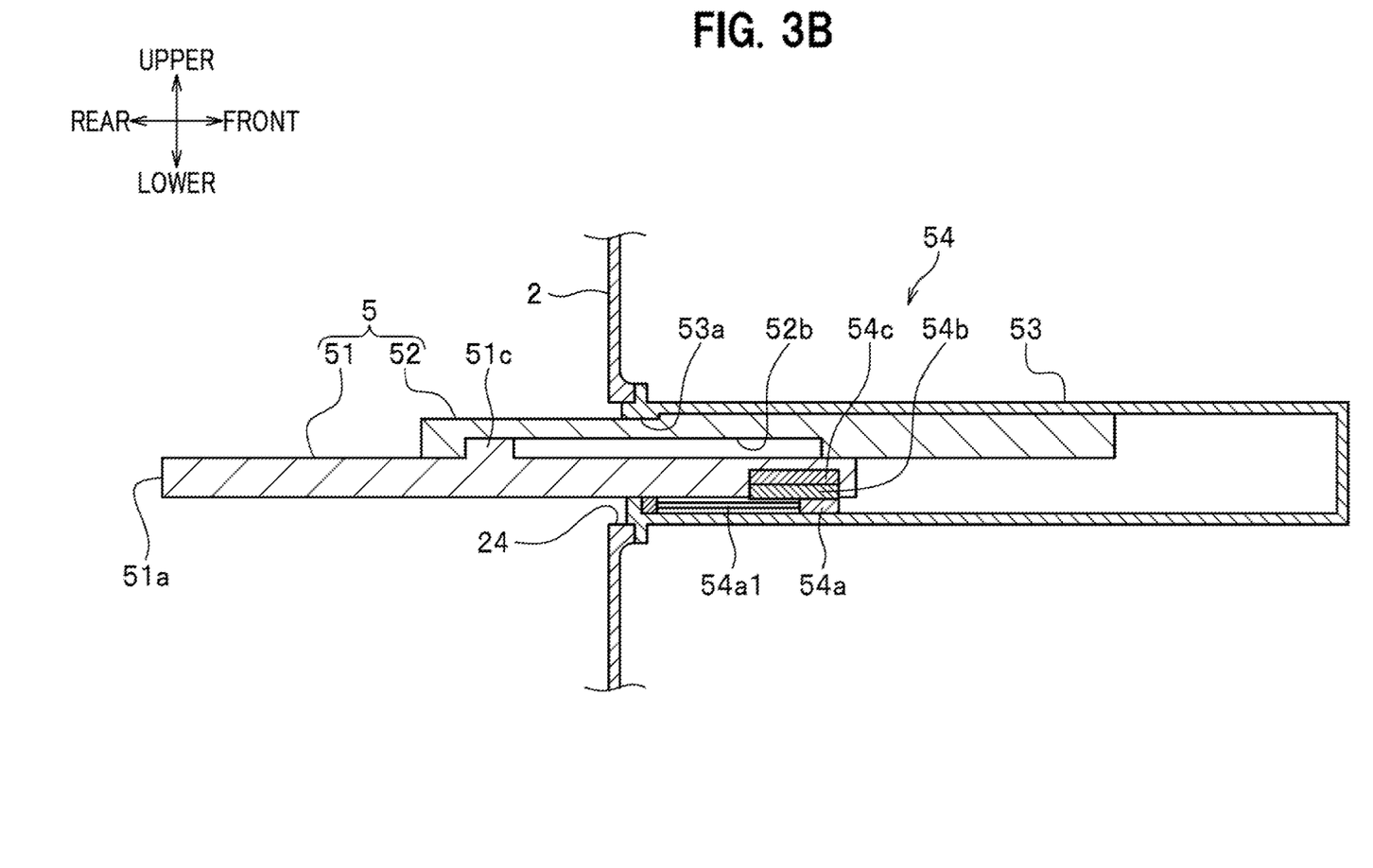
FIG. 3B is a cross-sectional view taken along the line IIIb-IIIb of FIG. 3A.

FIG. 3A is a partially enlarged perspective view showing the instrument panel 2 to which the second table 5 is attached, looking down diagonally from the upper rear right side. FIG. 3B is a cross-sectional view taken along the line IIIb-IIIb of FIG. 3A.

It should be noted that a casing 53, in which the second table 5 is stored, is represented by the hidden line (dotted line) in FIG. 3A.

As seen in FIG. 3A, the second table 5 includes a support table 51 and an upper table 52 that is stacked above the support table 51.

The support table 51 and the upper table 52 can be extended rearward from a state in which they are stored in the casing 53 that is provided inside the instrument panel 2 (at the front side of the vehicle). Although not shown in the drawings, the rear end surfaces 51a, 52a of the support table 51 and the upper table 52 that are stored in the casing 53 are flush with the surface portion of the instrument panel 2 surrounding an opening 24, from or into which the support table 51 and the upper table 52 are pulled out or stored.

As seen in FIG. 1, the support table 51 supports a lower surface 42a of an end portion 42b of the first table 4 (turning table 42) from below when the first table 4 (turning table 42) is extended or pulled out from the console body 31.

The support table 51 is formed of a plate member having a generally rectangular planar shape with the lateral width thereof same as the lateral width (length in the vehicle width direction) of the turning table 42.

As seen in FIG. 3A, when the second table 5 is extended or pulled out rearward from the instrument panel 2, the rear end surface 51a of the support table 51 is located more rearward than the rear end surface 52a of the upper table 52. Accordingly, an end portion 51b of the support table 51 serves to support the end portion 42b (see FIG. 1) of the turning table 42 (see FIG. 1).

The upper table 52 constituting the second table 5 is formed of a plate member having a generally rectangular planar shape with the lateral width thereof same as the lateral width (length in the vehicle width direction) of the turning table 42 (see FIG. 1).

Further, the thickness of the upper table 52 is the same as that of the turning table 42 (see FIG. 1).

With this configuration, when the end portion 42b (see FIG. 1) of the turning table 42 (see FIG. 1) is supported by the end portion 51b of the support table 51, the upper surface of the upper table 52 becomes flush with the upper surface of the turning table 42 (see FIG. 1) in the front-rear direction. In other words, as seen in FIG. 1, the upper surface of the upper table 52, the upper surface of the turning table 42, and the upper surface of the slide table 41 form a single continuous table surface 20 extending in the front-rear direction.

Next, an extension structure 54 of the second table 5 is described with reference to FIG. 3B.

In FIG. 3B, the reference numeral 2 denotes the instrument panel, the reference numeral 53 denotes the casing, the reference numeral 51 denotes the support table, and the reference numeral 52 denotes the upper table.

The casing 53 stores the support table 51 and the upper table 52 at the inner side of the instrument panel 2 (at the front side). The casing 53 has a rectangular solid-shaped interior space having a thin thickness in the upper-lower direction corresponding to the outer shape of the support table 51 and the upper table 52 having been stacked one on top of the other.

An opening 53a is formed at the rear portion of the casing 53. The opening 53a allows the support table 51 and the upper table 52 to extend out from the casing 53 and thus to protrude rearward. The instrument panel 2 has an opening 24 formed to correspond to the rear portion of the casing 53, and the casing 53 is attached to the instrument panel 2 with the rear portion thereof face the opening 24.

A guide groove 52b is formed on the lower surface of the upper table 52 constituting the second table 5. The guide groove 52b extends rearward from a central portion of the upper table 52.

A projection 51c is formed on the upper surface of the support table 51 constituting the second table 5. The projection 51c is fitted into the guide groove 52b of the upper table 52 and slidable in the front-rear direction.

As seen in FIG. 3B, the projection 51c is brought into contact with the rear end of the guide groove 52b when the second table 5 extends out rearward from the instrument panel 2. Although not shown in the drawings, the projection 51c is brought into contact with the front end of the guide groove 52b when the second table 5 is stored in the casing 53.

The extension structure 54 of the second table 5 includes an urging device 54a configured to urge the support table 51 rearward and equipped with a constant force spring 54a1, a damper device 54b formed of a hydraulic rotary gear (not shown) using hydraulic oil resistance, and a push-push engagement mechanism 54c having a heart cam groove (not shown) with a heart-shaped cam portion.

According to this extension structure 54, when the user pushes the rear end surface 51a of the support table 51 shown in FIG. 3B forward against the urging force of the urging device 54a, the projection 51c of the support table 51 is brought into contact with the guide groove 52b of the upper table 52 and the support table 51 is stored in the casing 53 together with the upper table 52.

When the support table 51 and the upper table 52 are stacked one on top of the other and reach the stowed position of the casing 53, the push-push engagement mechanism 54c produces a predetermined clicking feel and causes the support table 51 to be locked in the casing 53 at a timing at which the constant force spring 54a1 of the urging device 54a reaches a predetermined extension length. Accordingly, the stowed state of the support table 51 and the upper table 52 are maintained in casing 53.

Further, according to this extension structure 54, although not shown in the drawings, when the user pushes the rear end surface 51*a* of the support table 51 having been stored in the casing 53 in the stowed state further forward, the push-push engagement mechanism 54*c* produces a predetermined clicking feel and causes the support table 51 in the casing 53 to be disengaged.

Accordingly, as seen in FIG. 3B, the support table 51 is pushed out rearward from the casing 53 by means of the urging device 54*a*. Further, the upper table 52 is pushed out rearward from the casing 53 together with the support table 51 after the projection 51*c* is brought into contact with the rear end of the guide groove 52*b*.

The hydraulic rotary gear of the damper device 54*b* is in cooperation with the winding operation of the constant force spring 54*a*1 of the urging device 54*a*, so that the support table 51 and the upper table 52 are pushed out rearward from the casing 53 at a substantially constant speed by means of the resistance of the hydraulic fluid.

Accordingly, the second table 5 is expanded or deployed to such a position that it can cooperate with the end portion 42*b* (see FIG. 1) of the first table 4.

<<Expanded Aspect of Table Device>>

Next, the expanded aspect of the table device 1 is described below.

Figure 4A:
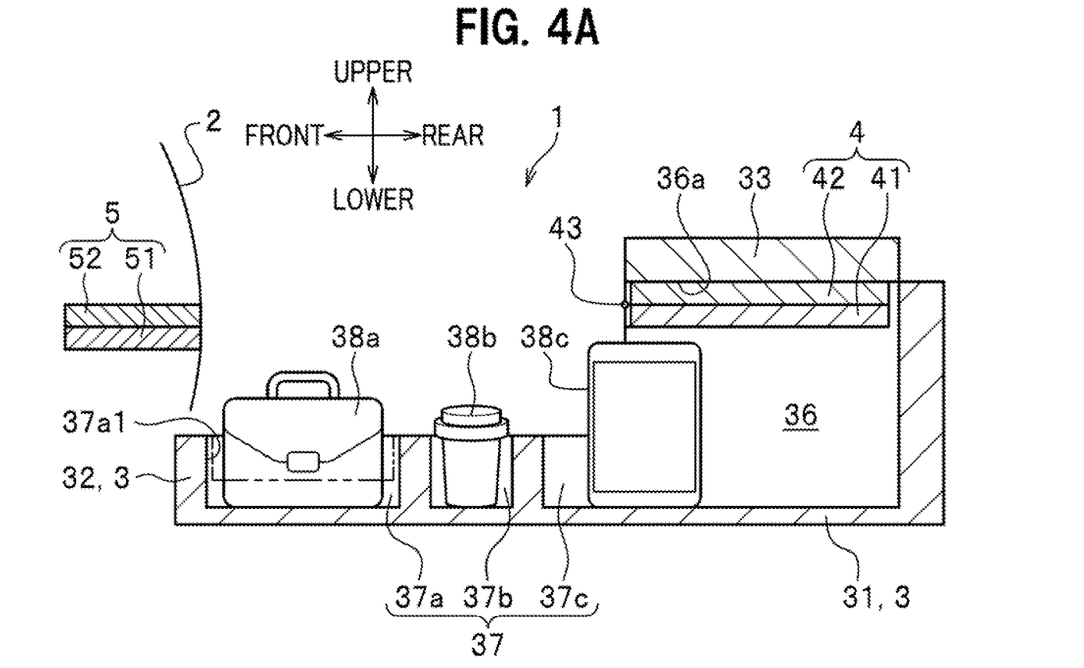
FIG. 4A is a view explaining an expanded aspect of the table device according to this embodiment, in particular, a schematic view showing an initial state of the table device in which the first table and the second table are stored.
Figure 4B:
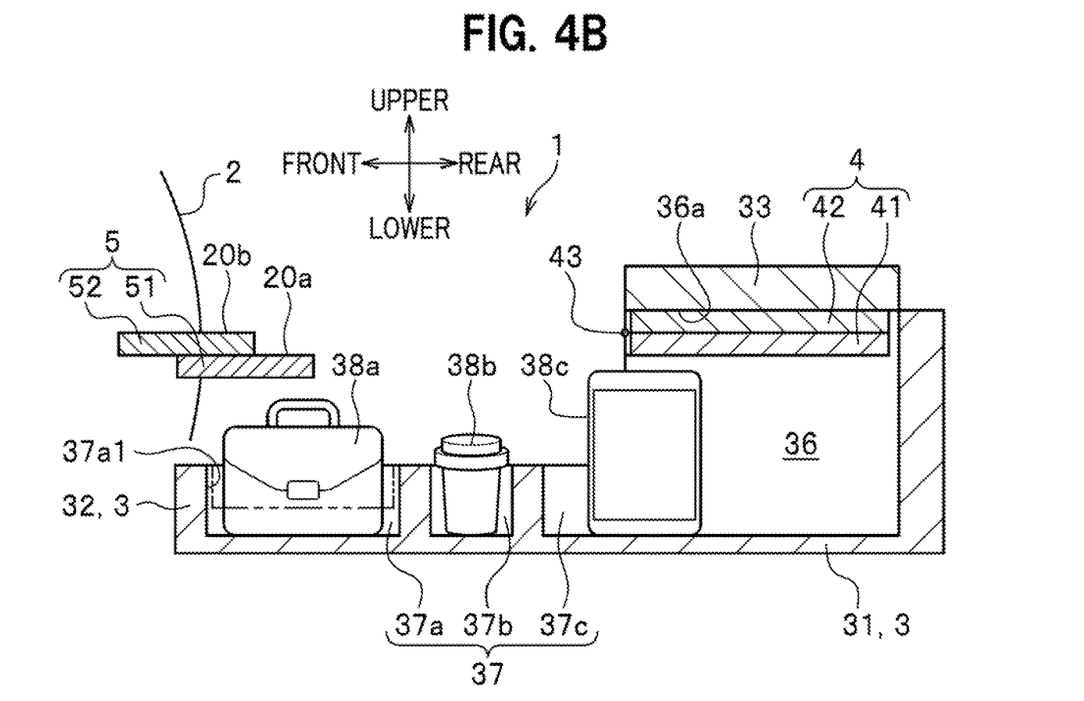
FIG. 4B is a view explaining an expanded aspect of the table device according to this embodiment, in particular, a schematic view showing a short table mode of the table device in which the second table has been extended from the initial state of the table device shown in FIG. 4A.
Figure 4C:
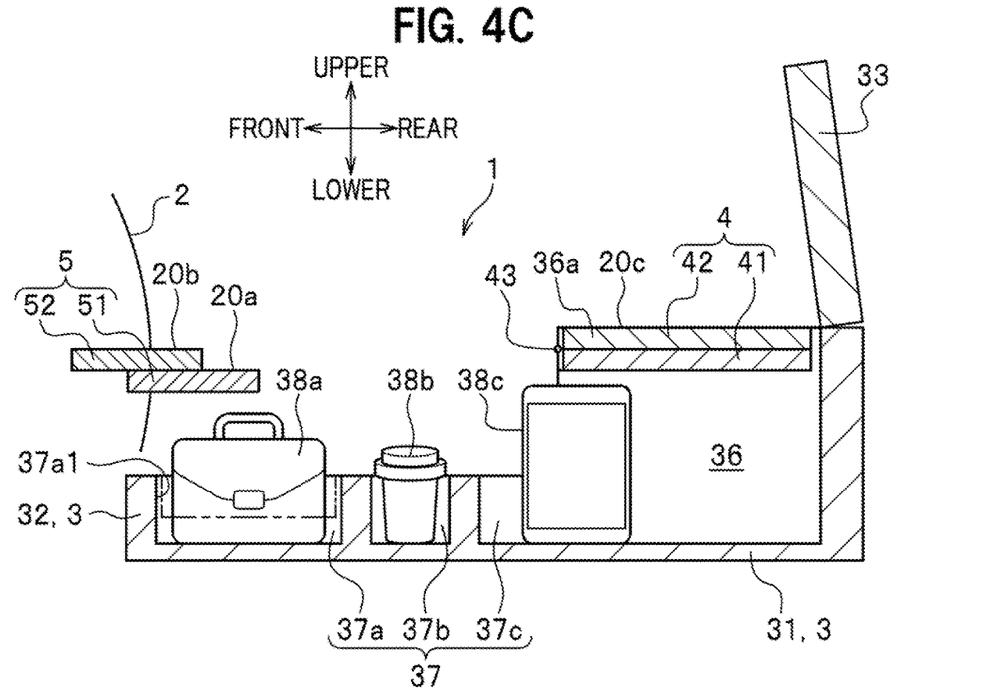
FIG. 4C is a view explaining an expanded aspect of the table device according to this embodiment, in particular, a schematic view showing a middle table mode of the table device in which an armrest has been flipped up from the short table mode of the table device shown in FIG. 4B and the first table is used without being deployed.
Figure 4D:
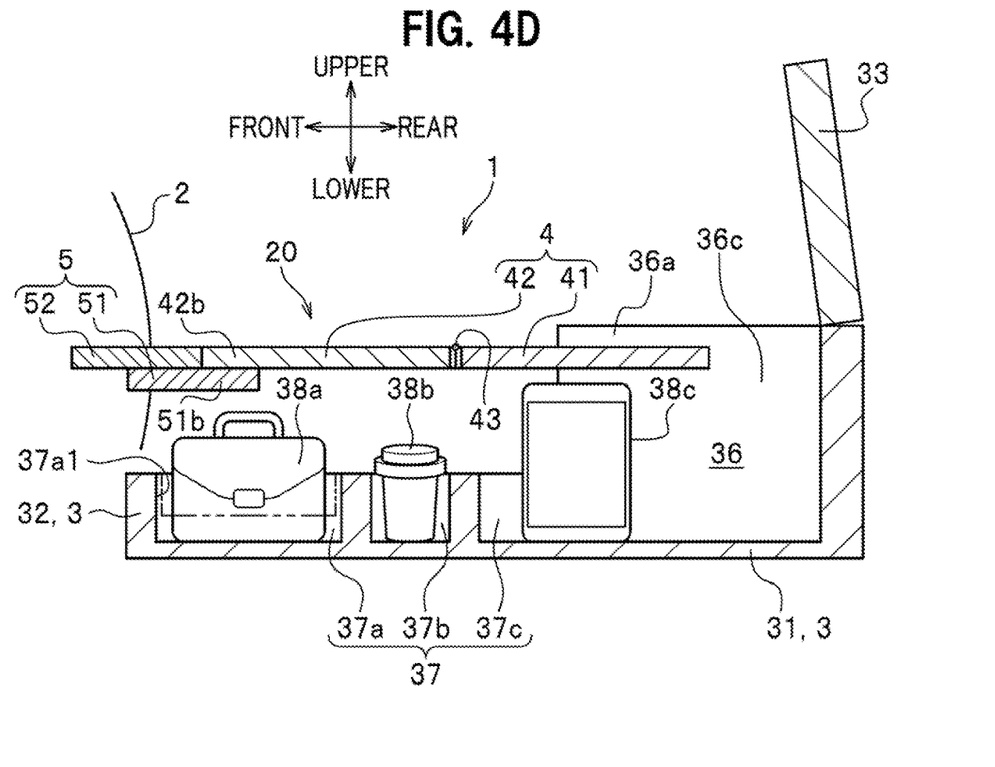
FIG. 4D is a view explaining an expanded aspect of the table device according to this embodiment, in particular, a schematic view showing a long table mode of the table device in which the first table has been expanded from the middle table mode of the table device shown in FIG. 4C.

FIG. 4A is a schematic view showing an initial state of the table device 1 in which the first table 4 and the second table 5 are stored. FIG. 4B is a schematic view showing a short table mode of the table device 1. FIG. 4C is a schematic view showing a middle table mode of the table device 1. FIG. 4D is a schematic view showing a long table mode of the table device 1. In FIGS. 4A to 4D, a bag 38*a* as an article is stored in the recess 37*a*, beverage cups 38*b* as articles are stored in the recess 37*b*, and a large portable electronic terminal 38*c* as an article is stored in the space where the recess 37*c* and the storage area 36 are integrated together.

<Initial State>

As seen in FIG. 4A, in the initial state of table device 1, the first table 4 is stored in the storage area 36 of the console body 31 in the console 3 and the second table 5 is stored inside the instrument panel 2. Further, the opening 36*a* of the console body 31 is closed by the armrest 33.

In FIG. 4A, the reference numeral 32 denotes the front extension portion of the console 3 in which the recesses 37*a*, 37*b*, 37*c* are formed. The reference numeral 37*a*1 denotes a load/unload opening for articles that is formed in the front extension portion 32 to correspond to the recess 37*a* and is shown by the phantom line (chain double-dashed line).

<Short Table Mode>

As seen in FIG. 4B, the second table 5 is expanded rearward from the instrument panel 2 in the short table mode of the table device 1. To be more specific, the support table 51 and the upper table 52 are extended rearward, so that the second table 5 is extended rearward from the instrument panel 2.

In this short table mode, the upper surface of the support table 51 that has been extended rearward from the upper table 52 can be used as a table surface 20*a* for placing articles. The upper surface of the upper table 52 can also be used as a table surface 20*b*.

<Middle Table Mode>

As seen in FIG. 4C, in the middle table mode of the table device 1, the armrest 33 as a lid member is flipped up to release the opening 36*a* of the storage area 36 of the console body 31. In the first table 4 stored in the upper portion of the storage area 36, the turning table 42 faces the opening 36*a*.

In this middle table mode, the turning table 42 can be used as a table surface 20*c* in addition to the second table that can be used as table surfaces 20*a*, 20*b*.

In this mode, the turning table 42 can be used in place of the armrest 33.

<Long Table Mode>

As seen in FIG. 4D, in the long table mode of the table device 1, the end portion 42*b* of the first table 4 (turning table 42) and the end portion 51*b* of the second table 5 (support table 51) cooperate with each other to form a continuous table surface 20 extending in the front-rear direction.

To be more specific, the slide table 41 stored in the storage area 36 as shown in FIG. 4C is slidably moved forward. When doing so, the protruding edge portions 41*a* of the slide table 41 that are slidably fitted into the guide grooves 39 (see FIG. 2) of the storage area 36 come into contact with the closed portions 39*a* (stopper) of the guide grooves 39. Accordingly, a part of the slide table 41 is left in the storage area 36, and the other remaining part of the slide table 41 is extended forward from the storage area 36.

In FIG. 4D, the reference numeral 36*c* denotes a load/unload opening of the storage area 36 that is newly formed by sliding the slide table 41 in the frontward direction.

Further, the turning table 42 is slidably moved forward together with the slide table 41, and then rotated around the hinges 43 (see FIG. 2) to cooperate with the second table 5 (support table 51) shown in FIG. 4C.

To be more specific, the end portion 51*b* of the support table 51 supports the lower surface 42*a* of the end portion 42*b* of the turning table 42, so that the upper surface of the slide table 41 of the first table 4, the upper surface of the turning table 42 of the first table 4, and the upper surface of the upper table 52 of the second table 5 together form a single table surface 20. This table surface 20 extends in the front-rear direction to connect the instrument panel 2 and the console body 31.

It should be noted that the cooperation between the end portion 42*b* of the first table 4 and the end portion 51*b* of the second table 5 is not limited to the above-described configuration as long as they are detachably engageable with each other. For example, one of the end portions 42*b*, 51*b* may have a recess, while the other one of the end portions 42*b*, 51*b* may have a protrusion to be detachably fitted into the recess.

The front extension portion 32 of the console 3 extends in the front-rear direction at a position lower than the height position of the console body 31 from which the first table 4 extends out. In other words, even if the first table 4 and the second table 5 are connected together, access to the recesses 37*a*, 37*b*, 37*c* formed in the front extension portion 32 to load or unload articles can be ensured without obstruction.

Operational Effects

Operational effects obtained by the table device 1 according to this embodiment are explained below.

The table device 1 of this embodiment is configured such that the first table 4 expandable forward from the console 3 (console body 31) and the second table 5 expandable rearward from the instrument panel 2 form a continuous table surface 20 extending in the front-rear direction.

With this configuration of the table device 1, it is possible to further improve the comfort of the vehicle cabin by ensuring a larger table surface 20 in the front-rear direction as compared with the conventional table device 1, for example, disclosed in JP 2001-277945 A.

In this table device 1, the second table 5 includes the support table 51 for supporting the lower surface of the end portion 42b of the first table 4 (turning table 42).

With this configuration of the table device 1, a larger table surface 20 extending between the instrument panel 2 and the console 3 can be formed by a simple structure and the support strength for the first table 4 can be improved.

In this table device 1, the first table 4 includes the slide table 41 (one table portion) and the turning table 42 (another table portion) that are stacked one on another in the upper-lower direction and stored in the storage area 36 of the console body 31.

With this configuration of the table device 1, the first table 4 extending long from the console body 31 in the frontward direction can be compactly stored in the storage area 36.

In this table device 1, the slide table 41 (one table portion) is slidable in the frontward direction while a part of the slide table 41 (one table portion) is left in the storage area 36.

With this configuration of the table device 1, a part of the slide table 41 left in the storage area 36 can be efficiently used as a table surface 20c (see FIG. 4C).

Further, with this configuration of the table device 1, the load/unload opening 36c for articles is newly formed in the storage area 36 after the slide table 41 is slidably moved.

The table device 1 further includes the armrest 33 attached to the console body 31 to open and close the opening 36a of the storage area 36.

With this configuration of the table device 1, the armrest 33 can be used as a lid member for the storage area 36. In other words, the first table 4 stored in the storage area 36 can be protected by the armrest 33 in the closed state. Further, the armrest 33 in the closed state can be used as a lid member for the load/unload opening 36c for articles that is newly formed in the storage area 36.

Further, in this table device 1, the recesses 37a, 37b, 37c (article storage areas) are formed below the first table 4 and the second table 5 by which the continuous table surface 20 extending in the front-rear direction is formed, with a predetermined interval left from the first table 4 and the second table 5.

With this configuration of the table device 1, when both the first table 4 and the second table 5 are expanded or deployed, a large storage space to load or unload articles can be ensured without creating a dead space caused by the article storage areas.

Further, in this table device 1, the recess 37a (article storage area) has the load/unload opening 37a1 for articles on the side thereof in the vehicle width direction.

With this configuration of the table device 1, access to the recess 37a (article storage area) to load or unload articles can be made more easily.

Further, in this table device 1, the second table 5 includes the upper table 52 whose rear end portion is shifted frontward of the rear end portion of the support table 51 when the second table 5 is extended rearward from the instrument panel 2.

With this configuration of the table device 1, the upper surface of the support table 51 can be used as the table surface 20a (see FIG. 4B) when the first table 4 is not expanded (i.e., in the small table mode and the middle table mode).

Although the present invention has been described with reference to this embodiment, the present invention is not limited to this specific embodiment and can be implemented in various forms.

What is claimed is:

1. A table device comprising:
a first table expandable forward from a center console; and
a second table stored in an instrument panel and expandable rearward from the instrument panel, wherein
the first table and the second table are configured such that an end portion of the first table and an end portion of the second table are detachably cooperative with each other to form a continuous table surface extending in a front-rear direction.

2. The table device according to claim 1, wherein
the second table includes a support table, and the support table has the end portion of the second table by which a lower surface of the end portion of the first table is supported.

3. A table device comprising:
a first table expandable forward from a center console; and
a second table expandable rearward from an instrument panel,
wherein
the first table and the second table are configured such that end portions thereof are detachably cooperative with each other to form a continuous table surface extending in a front-rear direction,
the first table comprises one table portion and another table portion different from the one table portion, the one table portion and the another table portion being stacked one on another in an upper-lower direction and stored in a storage area of the center console,
the one table portion is slidably supported in the storage area to slide in the front-rear direction, and
the another table portion is engaged to the one table portion so as to be expandable further forward from a front end portion of the one table portion.

4. The table device according to claim 3, wherein
the storage area has an opening that opens upward, and
the one table portion is arranged above the storage area to face the opening and slidable in a frontward direction while a part of the one table portion is left in the storage area.

5. The table device according to claim 4, further comprising an armrest attached to the center console to open and close the opening of the storage area.

6. The table device according to claim 3, wherein
another storage area different from the storage area is formed below the first table and the second table by which the continuous table surface extending in the front-rear direction is formed, with a predetermined interval left from the first table and the second table for allowing access to the another storage area to load or unload articles.

7. The table device according to claim 6, wherein
the another storage area has a load/unload opening for articles on a side thereof in a vehicle width direction.

8. A table device comprising:
a first table expandable forward from a center console; and
a second table expandable rearward from an instrument panel,
wherein
the first table and the second table are configured such that end portions thereof are detachably cooperative with each other to form a continuous table surface extending in a front-rear direction, the second table includes a support table, and the support table has the end portion of the second table by which a lower surface of the end portion of the first table is supported, and the second table includes an upper table to be stacked on the support table, a rear end portion of the upper table being positioned in a shifted position to be shifted frontward of a rear end portion of the support table when the second table is extended rearward from the instrument panel.

* * * * *